(12) United States Patent
Quiet et al.

(10) Patent No.: US 9,213,834 B2
(45) Date of Patent: Dec. 15, 2015

(54) PREVENTION OF USER INPUT CAPTURE

(75) Inventors: Duane Quiet, Hillsboro, OR (US);
Christopher Lord, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 8 days.

(21) Appl. No.: 13/977,297

(22) PCT Filed: Mar. 28, 2012

(86) PCT No.: PCT/US2012/030988
§ 371 (c)(1),
(2), (4) Date: Oct. 15, 2013

(87) PCT Pub. No.: WO2013/147769
PCT Pub. Date: Oct. 3, 2013

(65) Prior Publication Data
US 2014/0196145 A1    Jul. 10, 2014

(51) Int. Cl.
*G06F 12/16*    (2006.01)
*G06F 21/55*    (2013.01)
*G06F 21/00*    (2013.01)

(52) U.S. Cl.
CPC .............. *G06F 21/554* (2013.01); *G06F 21/00* (2013.01)

(58) Field of Classification Search
None
See application file for complete search history.

(56) References Cited

U.S. PATENT DOCUMENTS

2010/0064375 A1*  3/2010  Gorczowski et al. ........... 726/28
2011/0119496 A1   5/2011  Singh et al.

FOREIGN PATENT DOCUMENTS

| JP | 2008-186079 A | 8/2008 |
| WO | 2007/096648 A1 | 8/2007 |
| WO | 2013147769 A1 | 10/2013 |

OTHER PUBLICATIONS

International Preliminary Report on Patentability received for PCT Patent Application No. PCT/US2012/030988, mailed on Oct. 9, 2014, 5 pages.
International Search Report and Written Opinion received for PCT application No. PCT/US2012/030988, mailed on Nov. 28, 2012, 8 pages.

* cited by examiner

*Primary Examiner* — Brandon Hoffman
(74) *Attorney, Agent, or Firm* — Jordan IP Law, LLC

(57) ABSTRACT

Systems and methods may provide to prevent user input capture. In one example, the method may include measuring an attribute based on a user's interaction with a user input component of a user input device, generating a user input signature based on the measured attribute, generating an obscuring signature based on the user input signature, and transmitting a control signal, based on the obscuring signature, to obscure a user's input activity and prevent user input capture.

25 Claims, 2 Drawing Sheets

PREVENTION OF USER INPUT CAPTURE

BACKGROUND

1. Technical Field

Embodiments generally relate to prevention of user input capture. More particularly, embodiments relate to analyzing user input information and generating an obscuring effect to prevent user input capture.

2. Discussion

Keystroke capture (or keystroke logging) may be the process of tracking the keys struck on a keyboard, typically in a covert manner so that the person using the keyboard may be unaware that their actions are being monitored. Keystroke capturing techniques may allow a "bad actor" to decipher a user's keystroke input to compromise security measures (e.g., usernames, passwords, security codes, etc.).

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
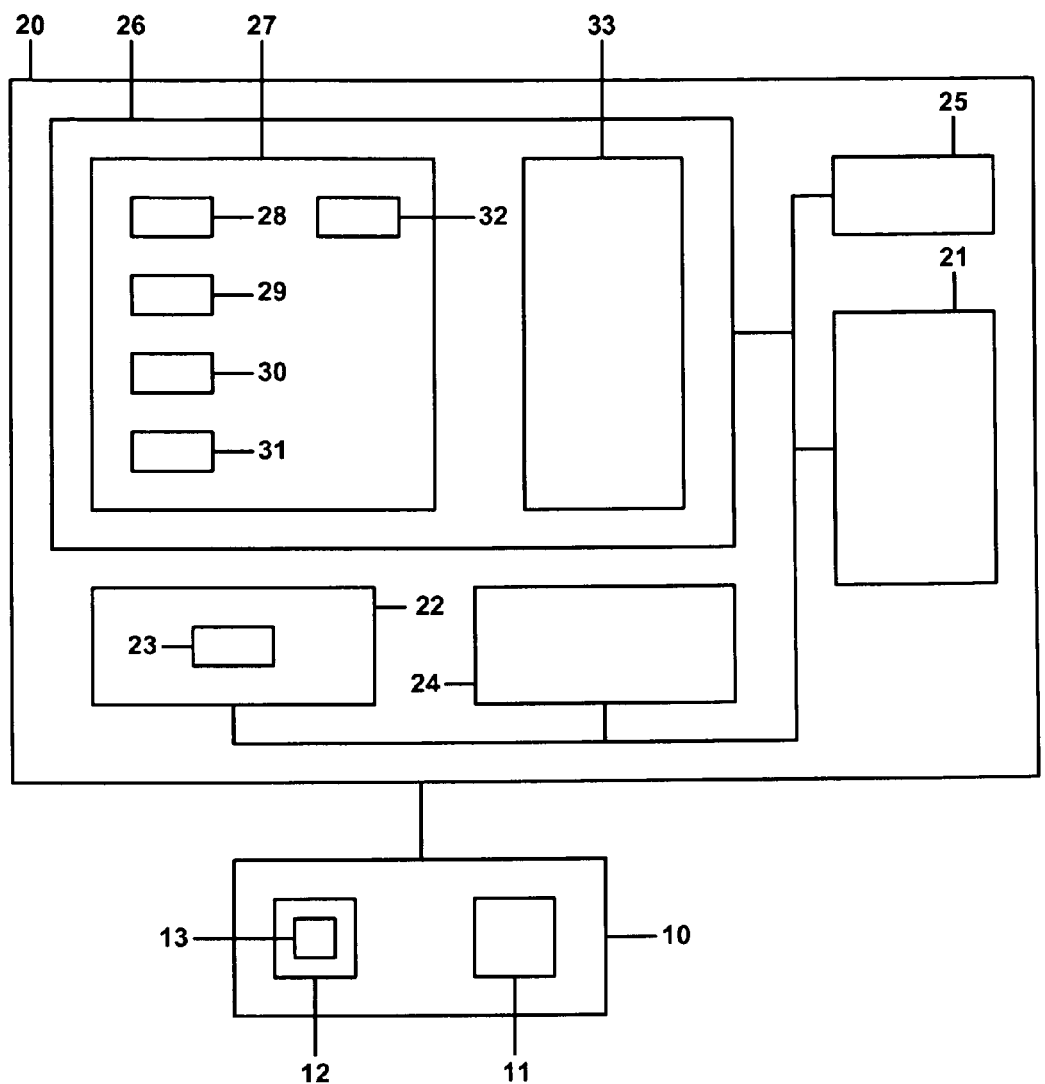
FIG. 1 is a block diagram of a computer system prevention user input capture in accordance with an embodiment of the invention.

Turning now to FIG. 1, a block diagram of a computer system 100 to prevent user input capture is shown. The computer system 100 may include a computing device 10 and a user input device 20.

The computing device 10 may be, among other things, any programmable machine that may carry out a sequence of logical operations. Examples of the computing device 10 may include a laptop, desktop, personal digital assistant (PDA), media player, automated teller machine (ATM), imaging device, mobile Internet device (MID), any smart device such as a smart phone, smart tablet, smart TV, or the like. In this embodiment the computing device 10 is a desktop computer.

The computing device 10 may include a processing device 11 and a memory device 12. The processing device 11 may include at least one computer processor that may be utilized to execute computer-readable executable instructions. The memory device 11 may be any device configured to store data. In this case, the memory device 11 stores, among other things, a computing device application 13, which may be executed by the processing device 11.

The user input device 20 may be a device configured to receive user input and transmit it to the computing device 10. Examples of the user input device 20 may include a computer keyboard, a mouse, a function key apparatus (e.g., on an ATM), or any other such device configured to receive a user's input. In this embodiment, the user input device 20 is a keyboard. The user input device 20 may include, for example, a user input component 21, a sensor configuration 22, a user input obscuring component 24, an amplifying component 25, and a user input analysis component 26.

The user input component 21 may be a component configured to allow a user to interact with the user input device 20 and enable receipt of user input. For example, in this embodiment, the user input component 21 may be keys on the keyboard. In other embodiments, the user input component 21 may be, among other things, a button (e.g., on a function key apparatus of an ATM), a screen (e.g., on a tablet device), and a touchpad (e.g., on a mouse of a notebook computer).

The sensor configuration 22 may be an arrangement of at least one sensor configured to measure attributes based on the user's interactions with the user input component 21. So, for example, in this case, the sensor configuration 22 includes an accelerometer 23 to sense and measure a user's use of the keys on the keyboard.

The sensor configuration 22 may be used to measure, for example, amplitude, frequency, periodicity, temperature, force, or any other such relevant characteristics relating to the user's input activity. Other sensor components that may be utilized in the sensor configuration 22 may include, for example, a gyroscope, a motion transducer, a temperature sensing device, or other such instruments for sensing and measuring aspects of the user's input activity.

The sensor configuration 22 may also be configured to generate and transmit a measurement signal. So, for example, the accelerometer may measure that a user is typing ten keystrokes per minute, and may transmit measurement signals to relay this information.

The user input obscuring component 24 may be a device configured to create an effect (e.g., mechanical) to obscure a user's input activity, prevent user input capture. In this embodiment, the user input obscuring component 24 may be at least one piezoelectric speaker that may be used to create a vibration that may obscure the user's input activity.

The amplifying component 25 may be a component configured the supplement and dissipate the effect created by the user input obscuring component 24. For example, in this embodiment, the amplifying component 25 may be a spreader configured to magnify the vibrations created by the user input obscuring component 24, and spread the vibrations through the entirety of the user input device 20.

The user input analysis component 26 may be a component configured to prevent user input capture. More specifically, as will be discussed in greater detail, the user input analysis component 26 may be configured to, among other things, receive, analyze, and transmit various information to prevent input capture. The user input analysis component 26 may include a user input analysis component memory 27 and a processor 33.

The user input analysis component memory 27 may be any device configured to store data. In this case, the user input analysis component memory 27 may store, among other things, a user input analysis application 28, user input characteristics 29, a user input signature 30, a user specific obscuring signature 31, and a predetermined obscuring signature 32.

The user input analysis application 28 may be an application configured to execute various tasks relating to prevention of input capture. For example, the user input analysis application 28 may be configured to receive measured information transmitted from the accelerometer 23.

In addition, the user input analysis application 28 may also be configured to analyze the measured information transmitted by the sensor component 22 with respect to various user input criteria. These user input criteria may include, for example, frequency (e.g., the frequency of a user's keystrokes), periodicity (e.g., the period of time between keystrokes), and force (e.g., the force with which the user strokes the keys on the keyboard), among other things.

The user input analysis application 28 may also be configured to generate the user input characteristics 29. The user input characteristics 29 may be a characteristics particular to the user's input activity that may be determined with respect to various user input criteria.

In this example, the user input analysis application 28 may analyze measured information transmitted by the sensor configuration 22 (e.g., with respect to frequency, periodicity, and force) to accumulate user input data to determine a user input characteristics 29 (e.g., the user types fifty keystrokes per minute). Examples of the types of user input data that the user input analysis application 28 may analyze to determine the user input characteristics 29 may include real-time data, historical data (e.g., data describing the user's past typing habits), analytical data (e.g., data based on statistical/mathematical analysis), and amalgamation data. Amalgamation data may include, among other things, data derived from the processing of multiple sensor data streams (e.g., both accelerometer and gyro data), or from more than one user.

The user input analysis application 28 may also be configured to utilize the user the input characteristics 29 (among other things) to generate the user input signature 30. The user input signature 30 may be an expression (e.g., a quantitative description, a qualitative description, a type, a category) that may describe the user's input (e.g., keystroke) activity. For example, the user input analysis application may utilize the input characteristics 29 to generate the user input signature 30 that, in effect, describes the user's typing frequency as slow, forceful, and includes many pauses.

The user input analysis application 28 may further be configured to utilize, among other things, the user input signature 30 to generate the obscuring signature 31. The obscuring signature 31 may be an expression that may be directed to obscuring the user's input activity.

So, for example, in this example, the user input analysis application 28 may utilize the user input signature 30 (e.g., the user types slowly, forcefully, and with many pauses) to generate an obscuring signature Si (e.g., the user types quickly, softly, and with minimal breaks) directed to Obscuring the user's input activity.

In other embodiments, the obscuring signature 31 may be directed to, for example, pseudo-randomly significantly increasing the number of keystrokes (e.g., create an effect doubling keystroke activity per minute), or introducing extraneous keystrokes (e.g., backspace key, escape key, etc.) intended to obscure the user's true keystroke activity. The generation of the obscuring signature 31 may also be dynamic, in that the obscuring signature 31 may be adjusted or modified (e.g., continuously, pseudo-randomly) responsive to, among other things, a change the user input characteristics 29.

In still other embodiments, the user input analysis application 28 may be configured to utilize the predetermined obscuring signature 32. The predetermined obscuring signature 32 may be an obscuring signature predetermined based on other criteria than the user's input activity.

For example, in one embodiment, the predetermined obscuring signature 32 may be directed to creating the effect that the input activity at the keyboard 20 is coming from an altogether different source (e.g., a second user) than the user. The predetermined obscuring signature 32 may be utilized, for example, when a user initially begins typing (i.e., before a user input signature has been determined).

Accordingly, the user input analysis application 28 may also be configured to generate and transmit control signals to the user input obscuring component 24 to create an effect (e.g., a mechanical effect) that may obscure a user's input activity to prevent user input capture. The control signals may be generated based on, among other things, the obscuring signature 29 and the predetermined obscuring signature 32.

So, for example, in this case, the user input application 28 may, in real-time, receive and utilize user input data (e.g., from the sensor configuration 22), and utilize one or more of the (generated) obscuring signature 29 and the predetermined obscuring signature 32 to transmit control signals to the piezoelectric speaker 24 to create and amplify vibrations that create an effect that the user types quickly, softly, and with minimal breaks.

The processing component 33 may include at least one computer processor that may be utilized to execute computer-readable executable instructions. For example, the processing component 33 may be utilized to execute the user input analysis application 28.

The arrangement and numbering of blocks depicted in FIG. 1 is not intended to imply an order of operations to the exclusion of other possibilities. Those of skill in the art will appreciate that the foregoing systems and methods are susceptible of various modifications and alterations.

For example, in the embodiment illustrated in FIG. 1, the various functionalities performed by the user input analysis application 28 may be executed by the processing component 33. However, this need not necessarily be the case. In other embodiments, any of these functionalities may instead be performed by a microcontroller including a firmware component, an application-specific integrated circuit, a logic array, a field programmable gate array, or the like.

Also, for example, in the embodiment illustrated in FIG. 1, the user input obscuring component 24 may be a piezoelectric speaker. However, this need not necessarily be the case. In other embodiments, the obscuring component 24 may be a haptic motor.

In addition, for example, in the embodiment illustrated in FIG. 1, the user input device 20 (i.e., the keyboard) may be coupled to the computing device 10 (i.e., the desktop computer). However, this need not necessarily be the case. In other embodiments, the user input device may be built into the computing device. So, for example, in the case of a notebook computer, the user input device (e.g., a keyboard) may be built into the notebook computer, along with a user input analysis component, a user device processing component and a user device memory component.

Figure 2:
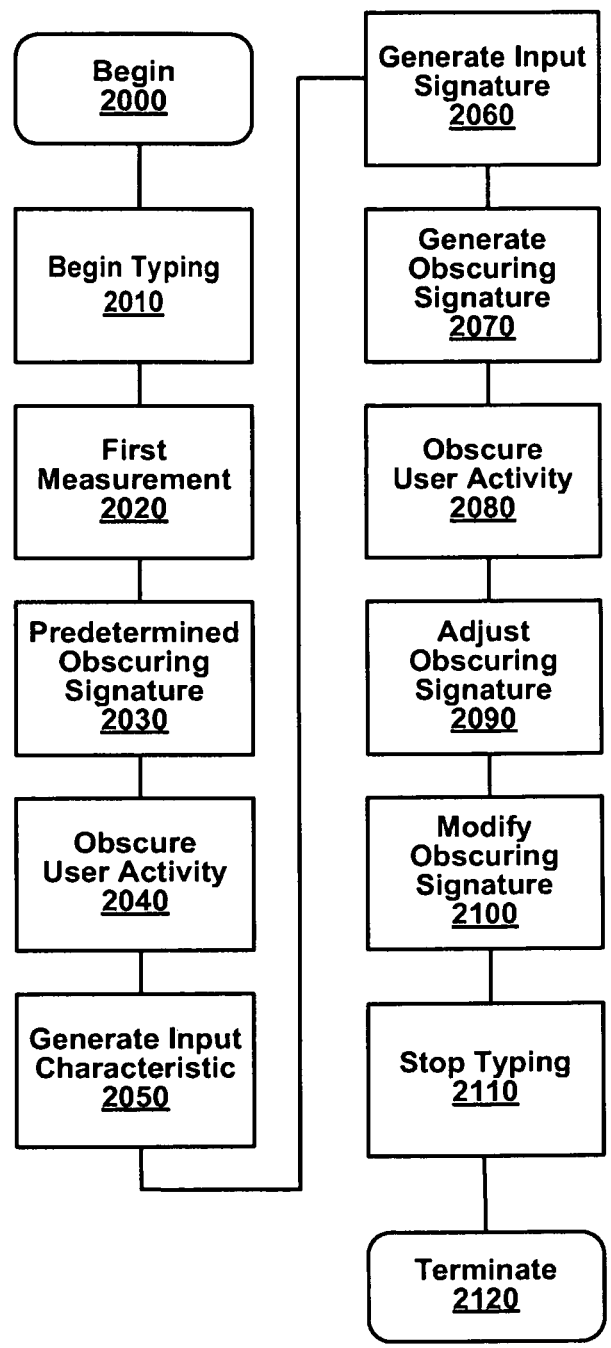
FIG. 2 is a flowchart of an example of a method of preventing of user input capture in accordance with an embodiment of the invention.

Turning now to FIG. 2, a flowchart of an example of a method to prevent user input capture in accordance with an embodiment of the invention is shown. In this embodiment, a user may utilize a keyboard, such as the user input device 20 (FIG. 1), on a desktop computer, such as the computing device 10 (FIG. 1), to input data.

The method might be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as, for example, Java, Smalltalk, C++ or the like and conventional procedural programming languages, such as, for example, the "C" programming language or similar programming languages.

The process may begin at processing block 2000. At processing block 2010, a sensor configuration, such as the sensor configuration 22 (FIG. 1), may utilize an accelerometer, such as the accelerometer 23 (FIG. 1), to determine that the user has begun typing. At processing block 2020, the sensor configuration may transmit a first measurement signal to indicate to a user input analysis application, such as the user input analysis application 28 (FIG. 1), that the user has started typing. At processing block 2030, the user input analysis application may access a predetermined obscuring signature, such as the predetermined obscuring signature 32 (FIG. 1), to obscure the user's keystroke activity. At processing block 2040, the predetermined obscuring signature may generate a first control signal based on the predetermined obscuring signature for transmission to a piezoelectric speaker, such as the user input obscuring component 24 (FIG. 1), directed to obscuring the user's keystroke activity and preventing keystroke capture.

At processing block 2050, after the user has been typing for a period of time, the user input analysis application may analyze the received measured information to generate a user input characteristic, such as the user input characteristic 29 (FIG. 1). At processing block 2060, after the user has been typing for a period of time, the user input analysis application may utilize the user input characteristic to generate a user input signature, such as the user input signature 30 (FIG. 1).

At processing block 2070, the user input analysis application may utilize the user input signature to generate an obscuring signature, such as the obscuring signature 31 (FIG. 1). At processing block 2080, the user input analysis application may generate a second control signal based on the obscuring signature for transmission to the piezoelectric speaker directed to obscuring the user's keystroke activity and preventing keystroke capture.

At processing block 2090, the user input analysis application may adjust the obscuring signature in response to changes in the user's input characteristics. At processing block 2100, the user input analysis may pseudo-randomly modify the obscuring signature to avoid repeatedly utilizing one particular obscuring signature. At processing block 2110, the user may stop typing on the keyboard. At processing block 2120, the process may terminate.

The sequence and numbering of blocks depicted in FIG. 2 is not intended to imply an order of operations to the exclusion of other possibilities. Those of skill in the art will appreciate that the foregoing systems and methods are susceptible of various modifications, variations, and alterations.

For example, in the embodiment illustrated in FIG. 1, upon sensing that the user has begun typing, the user input analysis application accesses a predetermined obscuring signature to obscure the user's keystroke activity (i.e., processing block 2030). However, this need not necessarily be the case. In other embodiments, the user input analysis application may be configured to generate an obscuring signature after a predetermined threshold has been met. For example, the user input analysis application may be configured to generate an Obscuring signature after a predetermined amount of input activity (e.g., after the first ten keystrokes), after a predetermined period of time (e.g., after the first ten seconds of user input), or the like.

Embodiments may therefore provide a computer implemented method of preventing user input capture, comprising analyzing an attribute based on a user's input activity and a user input criteria, and generating a user input signature based on the user input criteria. The method may also provide for generating an obscuring signature based on the user input signature, transmitting a control signal based on the obscuring signature to a user input obscuring component, and creating an effect to obscure the user's input activity.

In one example, a user input component facilitating the user's input activity is one or more of a key, a button, a screen, and a touchpad.

In one example, the attribute is one or more of amplitude, frequency, periodicity, temperature, and force.

In another example, the attribute is measured by a sensor configuration.

In one example, the sensor configuration includes one or more of an accelerometer, a gyroscope, a motion transducer, and a temperature sensing device.

In still another example, one or more of the generating the user input signature and the generating the obscuring signature is dynamic.

In another example, the method may also provide for transmitting a control signal based on a predetermined obscuring signature.

Embodiments may also include at least one machine readable medium comprising a plurality of instructions that in response to being executed on a computing device, cause the computing device to carry out any of the examples of the aforementioned method, an apparatus to prevent user input capture, comprising a user input component and logic to perform any of the examples of the aforementioned method, and a system to prevent user input capture comprising a computing device including a processing device and a memory device, and a user input device including a user input component and logic to perform the method of any of the examples of the aforementioned method.

Embodiments may also provide a computer implemented method of preventing user input capture, comprising analyzing an attribute based on a user's input activity, wherein the analysis is based on a user input criteria and a user input criteria, generating a user input signature based on the user input criteria, and generating an Obscuring signature based on the user input signature.

In one example, the method may also provide for transmitting a control signal based on the obscuring signature to a user input obscuring component In one example, the method may also provide for creating an effect to obscure the user's input activity.

In one example, a user input component facilitating the user's input activity is one of a key, a button, a screen, and a touchpad.

In another example, the attribute is one of amplitude, frequency, periodicity, temperature, and force.

In still another example, the attribute is measured by a sensor configuration. In another example, the sensor configuration includes one of an accelerometer, a gyroscope, a motion transducer, and a temperature sensing device.

In still another example, one or more of the generating the user input signature and the generating the obscuring signature is dynamic.

In another example, the method may also provide for transmitting a control signal based on a predetermined obscuring signature.

Embodiments may also include at least one machine readable medium comprising a plurality of instructions that in response to being executed on a computing device, cause the computing device to carry out any of the examples of the aforementioned method, an apparatus to prevent user input capture, comprising a user input component and logic to perform any of the examples of the aforementioned method, and a system to prevent user input capture comprising a computing device including a processing device and a memory device, and a user input device including a user input component and logic to perform the method of any of the examples of the aforementioned method.

Embodiments may also provide a system, comprising a computing device including processing device, memory device having an application, and a user input device. The user input device may include a user input component, a sensor configuration to measure an attribute based on a user's input activity with the user input component, and a user input Obscuring component to obscure the user's input activity. The user input device may also include a user input analysis component, an analysis module to analyze the attribute based on a user's input activity and a user input criteria, and an input signature module to generate a user input signature based on the user input criteria. The user input device may also include an obscuring signature module to generate an obscuring signature based on the user input signature, a instruction module to transmit a control signal based on the Obscuring signature to the user input obscuring component, an obscuring module to obscure the user's input activity, and a predetermined obscuring signature module to transmit a control signal based on a predetermined obscuring signature.

In addition, embodiments may provide for an apparatus, comprising a user input component, a sensor configuration to measure an attribute based on a user's input activity with the user input component, a user input obscuring component to obscure the user's input activity and a user input analysis component. The apparatus may also include an analysis module to analyze the attribute based on a user's input activity and a user input criteria, an input signature module to generate a user input signature based on the user input criteria, and an obscuring signature module to generate an obscuring signature based on the user input signature. The apparatus may further include a instruction module to transmit a control signal based on the obscuring signature to the user input obscuring component, an obscuring module to obscure the user's input activity, and a predetermined obscuring signature module to transmit a control signal based on a predetermined obscuring signature.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PM), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually mike the logic or processor.

Techniques described herein may therefore provide a feed-forward system that ensures both real-time operation of the consumer video pipeline and dynamic updating of the operating pipeline to deliver optimal visual perceptual quality and viewing experience. In particular, a discrete control system for the video pipeline can dynamically adapt operating points in order to optimize a global configuration of interactive component modules that are related to video perceptual quality. In a series configuration, the perceptual quality analysis module may be placed before the video processing pipeline and parameters determined for the post-processing pipeline may be used for the same frame. In the case of distributed computation of the quality analysis block or when perceptual quality analysis needs to be performed at intermediate points in the pipeline, the parameters determined using a given frame may be applied on the next frame to ensure real-time operation. Distributed computation is sometimes beneficial in reducing complexity as certain elements for perceptual quality computation may already be computed in the post-processing pipeline and can be re-used. Illustrated approaches may also be compatible with closed-loop control where the perceptual quality analysis is re-used at the output of the video processing pipeline to estimate output quality, which is also used by the control mechanism.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CDR, Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system, comprising:
    a computing device including:
        processing device;
        memory device having an application; and
    a user input device including:
        a user input component;
        a sensor configuration to measure an attribute based on a user's input activity with the user input component;
        a user input obscuring component to obscure the user's input activity;
        a user input analysis component;
        an analysis module to analyze the attribute based on a user's input activity and a user input criteria;
        an input signature module to generate a user input signature based on the user input criteria;
        an obscuring signature module to generate an obscuring signature based on the user input signature; and
        an instruction module to transmit a control signal based on the obscuring signature to the user input obscuring component,
        wherein the user input device further includes an obscuring module to obscure the user's input activity.

2. The system of claim 1, wherein the user input component is one or more of a key, a button, a screen, and a touchpad.

3. The system of claim 1, wherein the attribute is one or more of amplitude, frequency, periodicity, temperature, and force.

4. The system of claim 1, wherein the sensor configuration is to include one or more of an accelerometer, a gyroscope, a motion transducer, and a temperature sensing device.

5. The system of claim 1, wherein one or more of the generating the user input signature and the generating the obscuring signature is dynamic.

6. The system of claim 1, wherein the user input device further includes a predetermined obscuring signature module to transmit a control signal based on a predetermined obscuring signature.

7. An apparatus, comprising:
    a user input component;
    a sensor configuration to measure an attribute based on a user's input activity with the user input component;
    a user input obscuring component to obscure the user's input activity; and
    a user input analysis component;
    an analysis module to analyze the attribute based on a user's input activity and a user input criteria;
    an input signature module to generate a user input signature based on the user input criteria;
    an obscuring signature module to generate an obscuring signature based on the user input signature; and
    an instruction module to transmit a control signal based on the obscuring signature to the user input obscuring component,
    further including an obscuring module to obscure the user's input activity.

8. The apparatus of claim 7, wherein the user input component is one or more of a key, a button, a screen, and a touchpad.

9. The apparatus of claim 7, wherein the attribute is one or more of amplitude, frequency, periodicity, temperature, and force.

10. The apparatus of claim 7, wherein one or more of the generating the user input signature and the generating the obscuring signature is dynamic.

11. The apparatus of claim 7, further including a predetermined obscuring signature module to transmit a control signal based on a predetermined obscuring signature.

12. A computer implemented method, comprising:
    analyzing an attribute based on a user's input activity and a user input criteria;

generating a user input signature based on the user input criteria;

generating an obscuring signature based on the user input signature; and transmitting a control signal based on the obscuring signature to a user input obscuring component, including creating an effect to obscure the user's input activity.

13. The computer implemented method of claim 12, wherein a user input component facilitating the user's input activity is one or more of a key, a button, a screen, and a touchpad.

14. The computer implemented method of claim 12, wherein the attribute is one or more of amplitude, frequency, periodicity, temperature, and force.

15. The computer implemented method of claim 12, wherein the attribute is measured by a sensor configuration.

16. The computer implemented method of claim 15, wherein the sensor configuration is to include one or more of an accelerometer, a gyroscope, a motion transducer, and a temperature sensing device.

17. The computer implemented method of claim 12, wherein one or more of the generating the user input signature and the generating the obscuring signature is dynamic.

18. The computer implemented method of claim 12, including transmitting a control signal based on a predetermined obscuring signature.

19. At least one non-transitory computer readable storage medium comprising a set of instructions which, if executed by a processor, cause a computer to:

analyze an attribute based on a user's input activity and a user input criteria;

generate a user input signature based on the user input criteria;

generate an obscuring signature based on the user input signature; and transmit a control signal based on the obscuring signature to a user input obscuring component, wherein, if executed, the instructions cause a computer to create an effect to obscure the user's input activity.

20. The at least one computer readable storage medium of claim 19, wherein a user input component facilitating the user's input activity is one or more of a key, a button, a screen, and a touchpad.

21. The at least one computer readable storage medium of claim 19, wherein the attribute is one or more of amplitude, frequency, periodicity, temperature, and force.

22. The at least one computer readable storage medium of claim 19, wherein the attribute is measured by a sensor configuration.

23. The at least one computer readable storage medium of claim 22, wherein the sensor configuration is to include one or more of an accelerometer, a gyroscope, a motion transducer, and a temperature sensing device.

24. The at least one computer readable storage medium of claim 19, wherein one or more of the generating the user input signature and the generating the obscuring signature is dynamic.

25. The at least one computer readable storage medium of claim 19, wherein, if executed, the instructions cause a computer to transmit a control signal based on a predetermined obscuring signature.

* * * * *